United States Patent Office 3,372,130
Patented Mar. 5, 1968

3,372,130
CONTROL OF RATE OF RISE OF POLYURETHANE FOAMS WITH PHOSPHORIC ACID AND A TERTIARY AMINE
Samuel Chess, San Pedro, and Robert G. Pilmer, Palos Verdes Peninsula, Calif., assignors to The Upjohn Company, Kalamazoo, Mich., a corporation of Delaware
No Drawing. Continuation-in-part of application Ser. No. 397,026, Sept. 16, 1964. This application Mar. 2, 1967, Ser. No. 619,912
3 Claims. (Cl. 260—2.5)

ABSTRACT OF THE DISCLOSURE

The rate of foam rise in the preparation of polyurethane foams is controlled by employing as catalyst a combination of a tertiary amine and phosphoric acid; the amount of acid is less than required to neutralise the amine.

CROSS REFERENCE TO RELATED APPLICATION

This application is a continuation-in-part of application Ser. No. 397,026, filed Sept. 16, 1964, now abandoned.

BACKGROUND OF THE INVENTION

(1) Field of the invention

This invention relates to a novel process for the control of reaction rates in the production of rigid polyurethane foams and to the improved polyurethane foam compositions produced thereby. This invention is more particularly concerned with an improved process for making large slab stocks of rigid polyurethane foam and for the manufacture of poured insulating panels having a preformed metal frame.

(2) Description of the prior art

The general methods for the preparation of polyurethane foams by reaction of a polyol with a polyisocyanate in the presence of a blowing agent, either added to the mixture as such or generated in situ, are well known in the art. One of the problems which has not hitherto been solved satisfactorily is that created by the difficulty of controlling the speed with which reaction takes place in the foam. If reaction takes place very quickly the properties of the resulting foam are often marred by charring due to local overheating of the foam, and by stresses caused by local pressure from the blowing agent after the foam has set. On the other hand, if the rate of reaction is too slow, it is often possible for the blowing agent to generate gas for foaming purposes before the reaction mixture has reached the minimum viscosity necessary for foaming to take place. Under these circumstances blowing agent escapes from the reaction mixture before foaming can take place.

These difficulties are particularly apparent in the fabrication of rigid foams. Thus, in the preparation of large cross sections of rigid polyurethane foam, a too rapid rate of reaction can cause local charring and, more particularly, stretching at the top of "bun" pours with consequent reduction in the quantity of rigid foam to be recovered in the foam of cut board lengths. Further, in the preparation of insulating panels wherein the foam mixture is poured into a preformed hollow metal panel, a too rapid rate of reaction can cause the foam to rise so rapidly that it fails to adhere to the metal sides of the panel and merely slides over the surface of the metal. Shrinking and stretching at the top of said poured panels can also occur when the reaction rate is too high.

BRIEF SUMMARY OF THE INVENTION

The above described difficulties can be overcome by controlling the rate of reaction in the formation of the foam using the improved process of the invention. The process of the invention comprises, in its broadest aspect, a process for the preparation of polyurethane foams, wherein a polyol is condensed with a polyisocyanate in the presence of a blowing agent, a tertiary amine catalyst and a mineral acid in an amount insufficient to neutralise the amine catalyst.

DETAILED DESCRIPTION OF THE INVENTION

The various methods for the preparation of polyurethane foams are now well known in the art and do not require detailed discussion; see, for example, Dombrow, "Polyurethanes," Reinhold Publishing Corp., New York, pp. 1–105 (1957); Saunders et al., "Polyurethanes," Part I, Interscience Publishers, New York (1926). One of the commonest procedures consists in reacting a polyol, for example, a polyester or polyether, with an organic polyisocyanate and with water, if necessary in the presence of catalysts, surface active agents or other auxiliary agents, whereby simultaneous interaction between the isocyanate, water and the polyol occurs to give the required foam product. This is the so-called "one-shot" procedure. Alternatively the polyol may be reacted with sufficient polyisocyanate to give an intermediate reaction product containing free isocyanate groups and this product, known as prepolymer, may then be reacted with water, if desired in the presence of catalyst, surface active agents or other auxiliary agents, in order to produce the final foamed product. This latter is the so-called "prepolymer" process. Many variations in the method of carrying out these basic processes are known.

We have now found that it is possible to control the rate of rise in the preparation of foams by either the "one-shot" or "prepolymer'" process by employing a tertiary amine as catalyst in the presence of a mineral acid in an amount insufficient to neutralise the amine. It has been suggested previously that a mixture of a tertiary amine and a salt of a tertiary amine with a mineral acid can be used to reduce the tendency of open cell, sponge-type semi-rigid polyester foams to shrink on standing. However, it has not been suggested previously that the use of a mixture of a tertiary amine and a mineral acid could be employed to control the rate of rise in rigid and semi-rigid foams as described by applicants.

Illustrative of the mineral acids which can be used in the process of the invention are hydrochloric, hydrobromic, sulfuric, nitric, and phosphoric acids. The preferred acid is phosphoric acid (i.e. orthophosphoric acid).

The tertiary amines which can be employed in the process of the invention include N,N-dialkylalkanolamines such as N,N - dimethylethanolamine, N,N - diethylethanolamine, N,N - diisopropylethanolamine, and the like, N-alkylmorpholines such as N-methylmorpholine, N-ethylmorpholine, and the like, trialkylamines such as trimethylamine, triethylamine, triisobutylamine and the like, N,N,N',N'-tetraalkyl alkylenediamines such as N,N,N',N'-tetramethylethylenediamine, N,N,N',N'-tetramethyl - 1,3-propanediamine, N,N,N',N'-tetramethyl - 1,3 - butanediamine, and the like, and N,N-dialkylcycloalkylamines such as N,N-dimethylcyclohexylamine, N,N-diethylcyclopentylamine, N,N-dimethylcycloheptylamine and the like. The preferred amines are the trialkylamines with triethylamine especially preferred. The preferred combination of amine and mineral acid is the combination of triethylamine and phosphoric acid; this combination permits very fine adjustments of the rate of reaction to be made and the resultant foams exhibit optimum utilization of blowing agent, low friability and fast cure.

The mineral acids employed in the process of the invention can be added to the foam mixture as such, i.e., as the free acid, or can be added in combined form, for example, by reacting the mineral acid and the tertiary amine to form a mixture of the amine and amine acid addition salt, and using this mixture in the preparation of the foam.

Any of the prior art polyisocyanates conventionally used in the preparation of rigid polyurethane foams can be employed in the process of the present invention. Illustrative of such isocyanates are 2,4-tolylene diisocyanate, 2,6-tolylene diisocyanate, 4,4'-diphenylmethane diisocyanate, dianisidine diisocyanate, tolidine diisocyanate, hexamethylene diisocyanate, m-xylylene diisocyanate, 1,5-naphthalene diisocyanate, and other di- and higher polyisocyanates such as those listed in the tables of Siefken, Ann. 562, 122–135 (1949). Mixtures of two or more of the above isocyanates can be used if desired. Preferred polyisocyanates are products obtained by phosgenation of mixtures of methylene-bridged polyphenyl polyamines obtained by the interaction of formaldehyde, hydrochloric acid, and primary aromatic amines, for example, aniline, o-chloroaniline, o-toluidine, or mixtures thereof. Such polyisocyanates are known in the art, e.g., U.S. 2,683,730, 2,950,263, and 3,012,008; Canada Patent No. 665,495; and German Patent 1,131,877. A particularly preferred polyisocyanate of this type is the polymethylene polyphenyl isocyanate available commercially under the trademark PAPI.

A method of preparing this material is given in the aforesaid U.S. Patent No. 2,683,730 of Seeger and Fauser wherein aniline and formaldehyde are condensed in the presence of a mineral acid and the resulting mixture of amines is phosgenated to yield a corresponding mixture of polyisocyanates. As is disclosed in this patent the aniline and formaldehyde first react to form a mixture of secondary amines which rearrange to primary polyamines in the presence of the mineral acid. On phosgenation of this mixture of primary polyamines a mixture of di- and polyisocyanates, consisting predominantly of triisocyanates, tetraisocyanates, and higher polyisocyanates and not more than approximately 40% or so of diisocyanates is obtained.

Similarly any of the prior art polyols conventionally employed in the preparation of foams, can be employed in the process of the invention. As mentioned previously the process for controlling the rate of rise in polyurethane foams according to this invention can be appiled to a wide variety of foams including semi-rigid and rigid foams. For the reasons enumerated above it finds particular application in the preparation of rigid foams and it is to this particular use that the major proportion of the exemplification in this specification is directed. However, it will be understood that the present invention is not limited to this particular use and can be applied generally. The polyols conventionally employed in the preparation of polyurethane foams have a hydroxyl number within the range of approximately 180 to approximately 800. The polyols normally used for the preparation of rigid foams are those having a hydroxyl number in the range of approximately 300 to approximately 800.

Illustrative polyols which can be used in the process of the invention are polyethers such as polyoxyalkylene glycols such as the polyoxyethylene glycols prepared by the addition of ethylene oxide to water, ethylene glycols or diethylene glycol; polyoxypropylene glycols prepared by the addition of 1,2-propylene oxide to water, propylene glycol or dipropylene glycol; mixed oxyethylene-oxypropylene polyglycols prepared in a similar manner utilizing a mixture of ethylene oxide and propylene oxide or a sequential additon of ethylene oxide and 1,2-propylene oxide; polyether glycols prepared by reacting ethylene glycol, propylene oxide or mixtures thereof with mono- and polynuclear dihydroxy benzenes, e.g., catechol, resorcinol, hydroquinone, orcinol, 2,2-bis(p-hydroxyphenyl)methane, bis(p-hydroxyphenyl)propane, and the like; polyethers prepared by reacting ethylene oxide, propylene oxide, or mixtures thereof with aliphatic polyols such as glycerol, sorbitol, trimethylolpropane, 1,2,6-hexanetriol, pentaerythritol, sucrose or glycosides, e.g., methyl, ethyl, propyl, butyl, and 2-ethylhexyl, arabinoside, xyloside, fructoside, gluoside, rhamnoside, etc.; polyethers prepared by reacting ethylene oxide, propylene oxide or mixtures thereof with alicyclic polyols such as tetramethylolcyclohexanol; polyols containing a heterocyclic nucleus such as 3,3,5-tris(hydroxymethyl)-5-methyl-4-hydroxytetrahydropyran and 3,3,5,5-tetrakis(hydroxymethyl)-4-hydroxyeterahydropyan; or polyols containing an aromatic nucleus such as 2,2-bis(hydroxyphenyl)ethanol, pyrogallol, phloroglucinol, tris(hydroxyphenyl)alkanes, e.g., 1,1,3-tris(hydroxyphenyl)ethanes, and 1,1,3-tris(hydroxyphenyl) propanes, etc., tetrakis(hydroxyphenyl)alkanes, e.g. 1,1,3,3 - tetrakis(hydroxy - 3 - methylphenyl)propanes, 1,1,4,4-tetrakis(hydroxyphenyl)butanes, and the like.

A particularly useful polyol for employment in the process of the invention is a polyol mixture comprising a polyol adduct produced by mixing under hydroxyalkylation conditions from 2 to 20 molecular equivalents of ethylene oxide, propylene oxide, or 1,2-butylene oxide, or mixtures thereof, and one amine equivalent of a polyamine mixture, 100 parts of said polyamine mixture containing from 35 to 90 parts of methylene dianilines, the remaining parts being triamines and polyamines of higher molecular weight, said methylenedianilines, triamines, and polyamines of higher molecular weight having been formed by acid condensation of aniline and formaldehyde. Such polyols are available commercially under the trade name Carwinols in various equivalent weight ranges.

Illustrative of the polyester polyols which can be employed in the process of the invention are those prepared from dibasic carboxylic acids and polyhydric alcohols, preferably trihydric alcohols. The dibasic carboxylic acids useful in preparing the polyesters have no functional groups containing active hydrogen atoms other than their carboxylic acid groups. They are preferably saturated. Acids such as phthalic acid, terephthalic acid, isophthalic acid, succinic acid, glutaric acid, adipic acid, and pimelic acid are suitable. Anhydrides of these acids may be used also. The polyol component or components of the polyester are preferably trihydric. Examples of suitable polyols include trimethylolethane, trimethylolpropane, mannitol, hexanetriol, glycerine and pentaerythritol. Small amounts of dihydric alcohols such as ethylene glycol, diethylene glycol, 1,2-propylene glycol, 1,4-butanediol, and cyclohexanediol may also be used. In order that the polyurethane foam be sufficiently rigid, it is recommended that no more than about 20% of the hydroxyl groups of the polyester used be supplied by a diol. The above polyesters are typical of those which can be employed in the one-shot, but preferably in the prepolymer, methods of foaming using the process of the invention.

In making rigid foams in accordance with the process of the invention it is advantageous to add a hydroxyl terminated cross-linking polyol to the reaction mixture to form the best network for foam formation. Advantageously the crosslinking polyol should have at least 3 hydroxy groups in the molecule and can be added to the foam reaction mix at any point at which the other polyols are added. Examples of such crosslinking polyols are trimethylolpropane, glycerol, 1,2,6-hexanetriol, pentaerythritol, hydroxyalkylated aliphatic diamines such as N,N,N',N' - tetrakis(2 - hydroxypropyl)ethylenediamine, N,N,N',N'-tetrakis(2-hydroxyethyl)ethylenediamine, and the like, and alkylene oxide reaction products of sugars such as sucrose, and the like.

In carrying out the process of the invention the production of the rigid polyurethane foam is carried out in accordance with well-established prior art, the novel feature of the invention being the inclusion in the foam mixture of mineral acid in combination with a tertiary amine catalyst.

The amount of mineral acid employed is advantageously within the range of from about 0.0006 equivalent to about 0.012 equivalent per 100 parts by weight of polyol. Preferably the amount of mineral acid employed is within the range of about 0.0036 equivalent to about 0.0084 equivalent per 100 parts by weight of polyol. As mentioned previously the mineral acid can be added directly to the foam reaction mixture and this is the preferred procedure. Alternatively, the mineral acid can be pre-reacted with the tertiary amine catalyst to form a mixture of tertiary amine and tertiary amine acid addition salt, which mixture is then added to the foam reaction mixture. As a third, but less preferred, alternative a mixture of tertiary amine and tertiary amine acid addition salt (not necessarily derived from the same amine) can be prepared by direct admixture of the two components and this mixture is then added to the foam reaction mixture. The first named method i.e. the separate addition of amine and mineral acid directly to the foam mix is preferred because in certain instances the use of preformed amine salt can lead to difficulties due to incomplete assimilation of catalyst in the foam mix. Apart from the considerations just mentioned the order and method of adding the amine and mineral acid to the other components of the foam is not critical.

The amount of tertiary amine catalyst employed in the foam reaction mixture is advantageously within normally accepted limits, namely, within the range of about 0.015 equivalent to about 0.04 equivalent per 100 parts by weight of polyol employed in the mixture. The preferred range of concentration of tertiary amine catalyst is from about 0.02 equivalent to about 0.03 equivalent per 100 parts by weight of polyol.

From the above discussion of proportions of mineral acid and tertiary amine catalyst expressed in terms of parts per 100 parts of polyol, it will be seen that the advantageous proportions of mineral acid, expressed in terms of the amount of tertiary amine, are from 0.015 equivalent to about 0.80 equivalent of acid per equivalent of amine.

The porportions of isocyanate to polyol employed in the foam mixtures according to the process of the invention are within the normal limits employed in the production of rigid polyurethane foams. Thus the ratio of isocyanate to active hydrogen groups is within the range of from 1.50:1 to 0.65:1 and preferably within the range of 1.10:1 to 1:1, whether the isocyanate and polyol are employed separately in the one-shot process or whether the two components have been reacted to form a prepolymer. The lower ranges of isocyanate to hydroxyl group ratio are used where the polyol is highly functional.

The final foam density of the products produced by the process of the invention can be controlled in accordance with methods well known in the art. For example, this control can be accomplished by regulating the amount of water present in the foam mixture or by using a combination of water and a conventional blowing agent having a boiling point below about 110° C. and preferably below about 50° C. such as a volatile aliphatic hydrocarbon or a volatile highly halogenated hydrocarbon, for example, trichloromonofluoromethane, dichlorodifluoromethane, chlorotrifluoromethane, 1,1-dichloro-1-fluoroethane, 1-chloro-1,1-difluoro-2,2-dichloroethane and 1,1,1-trifluoro-2-chloro-2-fluorobutane or mixtures thereof.

Optional additives such as dispersing agents, cell stabilizers, surfactants, flame retardants, and the like which are commonly employed in the fabrication of rigid polyurethane foams, can be employed in the process of the invention. Thus a finer cell structure may be obtained if water-soluble organosilicone polymers are used as surfactants. Organosilicone polymers obtained by condensing a polyalkoxy polysilane with the monoether of a polyalkyleneether glycol in the presence of an acid catalyst are representative of those surfactants which can be used for this purpose. The organosilicone copolymer available under the trade name L-5320 is typical of such polymers. Other surfactants such as ethylene oxide modified sorbitan monopalmitate or ethylene oxide modified polypropyleneether glycol may be used, if desired, to obtain better dispersion of the components of the foam mixture.

Illustrative of the flame retardants which can be used in the foams of the invention are the highly halogenated organophosphorus compounds such as tris-(2,3-dibromopropyl)phosphate, supplied under the name "Firemaster" T23P, and the series of chloroethylated phosphorus derivatives available under the generic name of Phosgards.

A particularly advantageous method of increasing the fire retardant properties of the compounds produced by the process of the invention is to replace part of the polyol employed in the process of the invention by a phosphorus-containing polyol such as the products available commercially under the trade names Isonol FRP-8, Vircol 82, Vircol 638 and Fyrol 6.

Other additives such as dyes, pigments, soaps and metallic powders and other inert fillers may be added to the foam mixture to obtain special foam properties in accordance with practices well-known in the art.

While the improved process of the invention is applicable to the preparation of all types of rigid foams using any of the polyisocyanates and polyols discussed above and using either the one-shot or prepolymer techniques, it is of particular value in preparing rigid foams from polyisocyanates prepared by phosgenation of mixtures of methylene-bridged polyphenyl polyamines obtained by interaction of formaldehyde, hydrochloric acid, and primary aromatic amines as described above. The material available under the trademark PAPI is typical of such materials. Thus, using this type of isocyanate in combination with a polyol produced by hydroxy-alkylation of a polyamine mixture as described previously, it is possible to obtain a long delay in foam rise time using the process of the invention without any tendency for the polyisocyanate and the polyol to separate in the foam mixture. This is believed to be due to the close similarity in chemical structure between the above types of polyisocyanate and polyol. Using such systems it is possible to control the polymer strength build up to the point where the foam remains tacky (wet) upon completion of rise. This is of particular value in moulding operations where difficult configurations are required to be filled.

The rigid and semi-rigid polyurethane foams produced according to the improved process of the invention are useful for the purposes for which such foams are employed in the art, for example, for insulating purposes, either as slab stock or in preformed building panels, and, because of their ability to hold lubricants and to resist torque, as transmission plates in power transmission systems using fluids, and in similar systems. By varying the reaction conditions it is possible to produce self-extinguishing, high-density, and low-density foams where high fire retardance is desired in the end-product; or, in contrast, to produce non-self-extinguishing foams.

The following examples describe the manner and process of making and using the invention and set forth the best mode contemplated by the inventors of carrying out the invention but are not to be construed as limiting.

EXAMPLE 1

A series of non-self-extinguishing, moderate-density, rigid polyurethane foams was prepared from a foam mix which contained as amine catalyst, triethylamine or a mixture of triethylamine and N,N,N',N'-tetramethyl-1,3- butanediamine in the proportions (parts by weight) shown in Table I together with the following ingredients:

| | Parts by weight |
|---|---|
| Polyol, equivalent weight=163; an adduct of propylene oxide and a methylene bridged polyphenyl polyamine mixture obtained by acid condensation of aniline and formaldehyde | 100 |
| DC-201 (A water-soluble silicone-glycol copolymer cell control agent and foam stabiliser; see Bulletin 05-044, Dow Corning Corporation) | 2 |
| Water | 0.6 |
| Freon 11-B (trichloromonofluoromethane) | 40 |
| PAPI® (polymethylene polyphenyl isocyanate) | 100 |
| Phosphoric acid (85%) | 0.25 |

Ratio of isocyanate/hydroxyl groups=1.10/1.00.

Table I records (in seconds) the cream time (start of reaction), the gellation time and the rise time for each foam together with observations regarding the foaming operation and the resulting foam.

All the foams were prepared by mixing all the ingredients other than the isocyanate, adding the latter to the mixture using a high speed stirrer and, after 10 seconds of mixing, pouring the resulting mixture as quickly as possible into a mold.

TABLE I

| | XC-2 | XC-9 | XC-12 |
|---|---|---|---|
| Amine Catalyst: | | | |
| Triethylamine | 2.8 | 2 | 0.6 |
| Tetramethyl 1,3-butane diamine | | | 1.2 |
| Time (in seconds): | | | |
| Cream | 11 | 10 | 5 |
| Gellation | 155 | 230 | 166 |
| Rise | 340 | 469 | 216 |
| Remarks | (¹) | (¹) | (²) |

¹ Very good run; remained "wet" throughout foam rise. Little stretch. Fine cells.
² Good foam. Remained "wet" throughout rise. Fine cells. More stretch than with triethylamine alone.

EXAMPLE 2

A series of non-self-extinguishing, moderate-density, rigid polyurethane foams was prepared using the procedure described in Example 1 from a foam mix which contained phosphoric acid in combination with an amine catalyst consisting of triethylamine or triethylenediamine in the proportions (parts by weight) shown in Table II together with the following ingredients:

| | Parts by weight |
|---|---|
| A polyoxypropylene polyether polyol based on methyl glucoside; Hydroxyl No. 435 ±5 (G-435DM; see Bulletin No. 82-2-2, Olin Mathieson Corporation) | 100 |
| DC-201 | 2 |
| Water | 0.6 |
| Freon 11-B | 40 |
| PAPI® | 125 |

Ratio of isocyanate/hydroxyl groups=1.10/1.00.

Table II records (in seconds) the cream time, gellation time and the rise time for each foam together with observations regarding the foaming operation and resulting foam. In run X-3 the effect of neutralising the tertiary amine with the phosphoric acid is well illustrated.

TABLE II

| | X-3 | X-5 |
|---|---|---|
| 85% Phosphoric acid | 2.23 | 0.25 |
| Amine Catalyst: | | |
| Triethylamine | | 2.8 |
| Triethylenediamine (33% solution in dipropylene glycol; Dabco 33LV) | 1.5 | |
| Time (in seconds): | | |
| Cream | | 24 |
| Gellation | | 110 |
| Rise | | 187 |
| Remarks | (¹) | (²) |

¹ Completely neutralized catalyst; no cream or rise.
² Very good run. Gel and rise faster than XC-2, 9 and 12 (Example 1) resulting in more stretching.

EXAMPLE 3

A series of self-extinguishing, low-density, rigid polyurethane foams were prepared using the procedure described in Example 1 from a foam mix which contained phosphoric acid and triethylamine as amine catalyst in the proportions (parts by weight) shown in Table III together with the following ingredients:

| | Parts by weight |
|---|---|
| Polyol of eq. wt.=163, identical to that employed in Example 1 | 75 |
| A phosphorus containing polyol (propylene oxide-phosphoric acid adduct); eq. wt.=155 | 25 |
| DC-201 | 5 |
| Freon 11-B | 100 |
| PAPI® | 98 |

Ratio of isocyanate/hydroxyl groups=1.10/1.00.

Table III records (in seconds) the cream time, gellation time, and the rise time for each foam together with observations regarding the foaming operation and the resulting foam.

TABLE III

| | XC-14 | XC-16 |
|---|---|---|
| Phosphoric Acid | (¹) | (²) |
| Amine catalyst: Triethylamine | 2.5 | 2.5 |
| Time (in seconds): | | |
| Cream | 19 | 20 |
| Gellation | 205 | 180 |
| Rise | 306 | 360 |
| Remarks | (³) | (⁴) |

¹ 0.22 parts by weight of total acid (diluted with water in proportion 4 parts of acid to 96 parts water).
² 0.22 parts by weight of total acid (diluted with water in proportion 6 parts of acid to 94 parts water).
³ Very good run; remained "wet" pliable throughout rise. Fine cells.
⁴ Very good run. Little difference between this run and XC-14.

EXAMPLE 4

A series of sef-extinguishing, low-density, rigid polyurethane foams was prepared using the procedure described in Example 1 from a foam mix which contained phosphoric acid and either triethylamine or triethylenediamine as amine catalyst in the proportions (parts by weight) shown in Table IV together with the following ingredients:

| | Parts by weight |
|---|---|
| Polyol of eq. wt.=149.3; an adduct of propylene oxide and a methylene bridge polyphenyl polamine mixture obtained by acid condensation of aniline and formaldehyde | 75 |
| Phosphorus containing polyol eq. wt.=155 identical to that used in Example 3 | 25 |
| DC-201 | 5 |
| Freon 11-B | 100 |
| PAPI® | 98 |

Ratio of isocyanate/hydroxyl groups=1.10/1.00.

Table IV records (in seconds) the cream time start of reaction), gellation time, and rise time for each foam together with observations regarding the foaming operation and the resulting foam.

TABLE IV

| | XC-17 | XC-18 |
|---|---|---|
| 85% Phosphoric Acid | (¹) | (²) |
| Amine Catalyst: | | |
| Triethylamine | 2.5 | |
| Triethylenediamine (33 solution in dipropylene glycol; Dabco 33LV) | | 2.1 |
| Time (in seconds): | | |
| Cream | 19 | 15 |
| Gellation | 220 | 385 |
| Rise | 420 | 420 |
| Remarks | (³) | (⁴) |

¹ 0.22 parts by weight of acid (diluted with water in the proportion 6 parts of acid to 94 parts of water).
² 0.22 parts by weight of acid (diluted with water in the proportion of 4 parts of acid to 96 parts of water).
³ Very good run. Fine cells.
⁴ Good run. Less satisfactory and higher density than XC-17.

EXAMPLE 5

A series of high density, self-extinguishing foams was prepared by the prepolymer method. The prepolymer was prepared as follows:

A total of 100 parts by weight of PAPI® was charged to a clean, dry reaction vessel equipped with a stirrer, thermometer, and dry nitrogen sweep. To this vessel was added with stirring 6.3 parts by weight of an aniline-propylene oxide adduct of eq. wt. 107 and the nitrogen sweep was started. The reaction was allowed to proceed spontaneously and the reaction mixture was maintained at 70° C., with stirring, for 1 hour before being allowed to cool to room temperature. The prepolymer was maintained in a sealed, dry container until used in the preparation of a foam. The prepolymer so obtained had an amine equivalent of 154.

Using the prepolymer so obtained polyurethane foams were prepared using the procedure described in Example 1 which contained phosphoric acid and triethylamine as amine catalyst in the proportions (parts by weight) shown in Table V together with the following ingredients:

Parts by weight
The polyol of eq. wt. 163 employed in Example 1 _____ 100
Phosgard C-22-R _____ 25
  (a chlorine- and phosphorus-containing fire retardant
  the principal component of which has the structure)

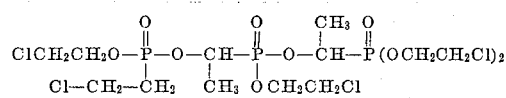

DC-201 _____ 2
Water _____ 0.6
85% phosphoric acid _____ 0.13
Freon 11-B _____ 12
PAPI® prepolymer _____ 115

Ratio of isocyanate/hydroxyl groups=1.10/1.00.

Table V records (in seconds) the cream time, gellation time, and rise time for each foam together with observations regarding the foaming operations and the resulting foam.

TABLE V

|  | XC-24 | XC-26 |
|---|---|---|
| Amine catalyst: Triethylamine | 2.0 | 1.2 |
| Time (in seconds): | | |
|   Cream | 19 | 40 |
|   Gellation | 120 | 140 |
|   Rise | 300 | 240 |
| Remarks | (¹) | (²) |

¹ Very good run. Foam remains "wet" throughout foam rise.
² Very good run. Remains flowable and "wet" throughout foam rise

EXAMPLE 6

A self-extinguishing, high-density, polyurethane foam was prepared using the procedure described in Example 1 from the following foam mix:

Parts by weight
Polyol of eq. wt. 149.3 identical to that employed in
  Example 4 _____ 100
Phosphorus containing polyol eq. wt. 155 identical to
  that used in Example 3 _____ 25
DC-201 _____ 2
Water _____ 0.6
85% phosphoric acid _____ .13
Freon 11-B _____ 24
PAPI® prepolymer (prepolymer as described in
  Example 5) _____ 132
Triethylamine _____ 2.0

Ratio of isocyanate/hydroxy groups=1.10/1.00.

The cream time was 19 seconds, the gellation time 120 seconds and the rise time was 300 seconds. The run was satisfactory in that the requisite delay in cream, gellation and rise times was achieved but the density was low due to excess Freon.

EXAMPLE 7

A series of rigid polyurethane foams was prepared using the procedure described in Example 1 from a foam mix containing the following ingredients together with varying amounts (parts by weight) of triethylamine and 85% phosphoric acid as shown in Table VI below.

Basic formulation:                                    Parts by weight
  Polyoxypropylene polyether polyol identical to
    that employed in Example 2 _____ 100
  DC-201 _____ 2
  Freon 11-B _____ 35
  PAPI® _____ 112

Ratio of isocyanate/hydroxy groups=1.10/1.0.

Table VI records (in seconds) the cream time, gellation time, rise time, and tack time for each foam together with observations regarding the foaming operations and resulting foam. Runs XC-43, 60 and 61 are control runs (no phosphoric acid) and demonstrate the marked increase in gellation, rise, and tack times produced by inclusion of the mineral acid.

EXAMPLE 8

A series of rigid polyurethanes foams was prepared using the procedure described in Example 1 from a foam mix containing the following ingredients together with varying amounts (parts by weight) of triethylamine and sulfuric acid as shown in Table VII below.

Basic formulation:                                    Parts by weight
  Polyoxypropylene polyether polyol identical to
    that employed in Example 2 _____ 100
  DC-201 _____ 2
  Freon 11-B _____ 35
  PAPI® _____ 112

Table VII records (in seconds) the cream time, gellation time, rise time, and tack time for each foam together with observations regarding the foaming operations and resulting foam.

TABLE VI

|  | XC-43 | XC-56 | XC-55 | XC-54 | XC-44 | XC-45 | XC-46 | XC-47 | XC-57 | XC-60 | XC-48 | XC-58 | XC-61 | XC-53 | XC-49 |
|---|---|---|---|---|---|---|---|---|---|---|---|---|---|---|---|
| TEA | 2.2 | 2.2 | 2.2 | 2.2 | 2.2 | 2.2 | 2.2 | 2.2 | 2.0 | 1.0 | 2.2 | 1.5 | 0.6 | 2.2 | 2. |
| 85% H₃PO₄ |  | .05 | .10 | .20 | .25 | .30 | .35 | .45 | .50 |  | 1.00 | .50 |  | 1.5 | 2. |
| Excess amine equivalents | .0217 | .0211 | .0205 | .0193 | .0187 | .0181 | .0175 | .0163 | .0138 | .0099 | .0097 | .0088 | .0059 | .0025 | −.0023 |
| Cream (sec.) | 32 | 40 | 40 | 45 | 60 | 65 | 70 | 65 | 80 | 48 | 80 | 98 | 85 | 120 |  |
| Gell (sec.) | 60 | 215 | 240 | 290 | 245 | 245 | 270 | 300 | 320 | 92 | 400 | 517 | 135 |  |  |
| Rise (sec.) | 168 | 408 | 454 | 540 | 445 | 479 | 478 | 517 | 605 | 196 | 805 | 780 | 240 |  |  |
| Tack (sec.) | 260 | 760 | 480 | 610 | 580 | 585 | 580 | 600 | 720 | 300 | −930 | 1200 | 360 |  |  |
| Remarks | Control | (¹) | (²) | (²) | (²) | (³) | (³) | (³) | (⁴) | (⁵) | (⁶) | (⁷) | (⁷) | (⁸) | (⁹) |

¹ Sl. wet, fine cells, good foam.
² Wet, fine cells, good foam.
³ Wet, fine cells, good foam, slightly friable surface.
⁴ Sl. wet until gell, poor Freon utility, control.
⁵ Wet, fine cells, good foam, friable surface.
⁶ Very wet, fine cells, poor cure, very friable surface, fair freon utility
⁷ Very wet, med. cells, poor cure, poor Freon utility, control.
⁸ Foam did rise 18 minutes after cream.
⁹ Foam did not cream or rise after 15 minutes.

TABLE VII.—SULFURIC ACID

|  | XC-63 | XC-64 | XC-66 | XC-65 |
|---|---|---|---|---|
| TEA | 2.2 | 2.2 | 1.8 | 2.2 |
| $H_2SO_4$ | 0.25 | 0.5 | 0.5 | 1.0 |
| Excess amine equivalents | .0192 | .0166 | .0127 | .0116 |
| Cream | 45 | 56 | 60 | -------- |
| Gell | 176 | 254 | 390 | -------- |
| Rise | 260 | 438 | 660 | -------- |
| Tack | 420 | 540 | 840 | -------- |
| Remarks | (1) | (2) | (3) | (4) |

[1] Wet, fine cells, poor cure, slightly friable surface, good foam.
[2] Wet, fine cells, poor cure, friable surface, good foam.
[3] Wet, fine cells, poor cure, very friable surface, good foam.
[4] Foam did not cream or rise after 10 minutes.

EXAMPLE 9

A rigid polyurethane foam was prepared from the following ingredients using the procedure described in Example 1.

|  | Parts by weight |
|---|---|
| Polyoxypropylene polyether polyol identical to that employed in Example 2 | 100 |
| DC-201 | 2 |
| Freon 11-B | 35 |
| PAPI® | 112 |
| Triethylamine | 2.2 |
| Hydrochloric acid (37%) | 0.25 |

The cream gell, rise, and tack times of the foam mix were 35, 120, 215, and 360 seconds, respectively. The resulting foam was characterised by fine cells and good appearance.

EXAMPLE 10

A series of rigid polyurethane foams was prepared, using the procedure described in Example 1, from a foam mix containing the following ingredients together with varying amounts (parts by weight) of triethylamine, 85% phosphoric acid, and PAPI®.

|  | Parts by weight |
|---|---|
| Polyol of eq. wt. 150 (a blend of 72% of the product of hydroxyalkylation of a methlene bridged polyphenyl polyamine with propylene oxide and 28% of the product of hydroxyalkylation of aniline with propylene oxide) | 100 |
| DC-201 | 2 |
| Freon 11-B | 32 |

The cream, gell, rise and tack times of the foam mixes together with observations regarding the foaming operations and resulting foams are shown in Table VIII. The ratio of equivalents of isocyanate/hydroxyl groups in Runs XC-29 and XC-33 was 1.35 and that in Runs XC-35 and XC-42 was 1.50.

TABLE VIII

|  | XC-29 | XC-33 | XC-35 | XC-42 |
|---|---|---|---|---|
| TEA | 2.8 | 2.2 | 2.2 | 2.2 |
| 85% $H_3PO_4$ | 0.25 | 0.25 | 0.25 | 0.50 |
| Excess amine equivalents | .0247 | .0187 | .0187 | .0157 |
| PAPI | 113 | 113 | 125 | 125 |
| Cream (sec.) | 25 | 28 | 27 | 30 |
| Gell (sec.) | 110 | 150 | 173 | 190 |
| Rise (sec.) | 290 | 345 | 420 | 504 |
| Tack (sec.) | 330 | 450 | 540 | 596 |
| Remarks | (1) | (1) | (1) | (1) |

[1] Wet, good foam, fine cells.

EXAMPLE 11

A series of rigid polyurethane foams was prepared using the procedure described in Example 1 from a foam mix containing the following ingredients together with varying amounts (parts by weight) of triethylamine, phosphoric acid, water and PAPI® as shown in Table IX below. The PAPI® concentration was always adjusted so that the ratio of equivalents of isocyanate/hydroxyl groups was always 1.10:1.0.

Basic formulation:

|  | Parts by weight |
|---|---|
| Polyol identical to that used in Example 10 | 100 |
| DC-201 | 2 |
| Freon 11-B | 32 |

Table IX records (in seconds) the cream time, gellation time, rise time, and tack time for each foam together with observations regarding the foaming operations and resulting foam.

TABLE IX

|  | XC-30 | XC-27 | XC-36 | XC-34 | XC-39 | XC-40 | XC-41 |
|---|---|---|---|---|---|---|---|
| TEA | 2.8 | 2.5 | 2.2 | 2.2 | 2.2 | 2.2 | 2.2 |
| 85% $H_3PO_4$ | 0.25 | 0.25 | 0.30 | 0.25 | 0.45 | 0.50 | 0.50 |
| Water | | | | 0.6 | | | 0.6 |
| Excess amine equivalents | .0247 | .0217 | .0181 | .0187 | .0163 | .0157 | .0157 |
| PAPI® | 92 | 92 | 92 | 101 | 92 | 92 | 101 |
| Cream (sec.) | 16 | 19 | 21 | 19 | 28 | 18 | 18 |
| Gell (sec.) | 117 | 151 | 159 | 161 | 181 | 185 | 182 |
| Rise (sec.) | 275 | 394 | 387 | 340 | 420 | 445 | 381 |
| Tack (sec.) | 330 | 450 | 480 | 465 | 550 | 584 | 477 |
| Remarks | (1) | (1) | (1) | (1) | (1) | (1) | (1) |

[1] Wet, fine cells, good foam.

EXAMPLE 12

A series of rigid polyurethane foams was prepared using the procedure described in Example 1 from a foam mix containing the following ingredients together with varying amounts (parts by weight) of triethylamine, phosphoric acid, and PAPI® as shown in Table X below. The PAPI® concentration was always adjusted so that the ratio of equivalents of isocyanate/hydroxyl groups was 1.20:1.0.

Basic formulation:

|  | Parts by weight |
|---|---|
| Polyol identical to that used in Example 10 | 100 |
| DC-201 | 2 |
| Freon 11-B | 32 |

Table X records (in seconds) the cream time, gellation time, rise time, and tack time for each foam with observations regarding the foaming operations and resulting foam.

TABLE X

|  | XC-28 | XC-32 | XC-37 | XC-38 |
|---|---|---|---|---|
| TEA | 2.8 | 2.2 | 2.2 | 2.2 |
| 85% $H_3PO_4$ | 0.25 | 0.25 | 0.35 | 0.40 |
| Excess amine equivalents | .0247 | .0187 | .0175 | .0169 |
| PAPI | 99 | 99 | 99 | 99 |
| Cream (sec.) | 25 | 23 | 26 | 28 |
| Gell (sec.) | 175 | 152 | 164 | 172 |
| Rise (sec.) | 298 | 352 | 368 | 410 |
| Tack (sec.) | 330 | 430 | 455 | 494 |
| Remarks | (1) | (1) | (1) | (1) |

[1] Wet, fine cells, good foam.

We claim:

1. A method of controlling the rate of rise in the preparation of a polyurethane foam which comprises reacting an organic polyisocyanate and a polyol in the presence of a blowing agent, a tertiary amine catalyst, and phosphoric acid, said phosphoric acid being employed in an amount within the range of about 0.015 equivalent to about 0.80 equivalent per equivalent of tertiary amine catalyst.

2. The process of claim 1 wherein the tertiary amine catalyst is triethylamine.

3. The process of claim 1 wherein the tertiary amine is employed in an amount from about 0.015 equivalent to about 0.04 equivalent per 100 parts by weight of polyol.

References Cited

UNITED STATES PATENTS

| | | | |
|---|---|---|---|
| 2,620,349 | 12/1952 | Slocombe | 260—453 |
| 2,692,873 | 10/1954 | Langerak et al. | 260—77.5 |
| 2,692,874 | 10/1954 | Langerak | 260—77.5 |
| 2,948,691 | 8/1960 | Windemuth et al. | 260—2.5 |
| 3,136,731 | 6/1964 | Piechota et al. | 260—2.5 |
| 3,201,358 | 8/1965 | Hostettler et al. | 260—2.5 |
| 3,208,959 | 9/1965 | Gmitter | 260—2.5 |

FOREIGN PATENTS

| | | |
|---|---|---|
| 211,639 | 10/1957 | Australia. |
| 831,301 | 3/1960 | Great Britain. |

DONALD E. CZAJA, *Primary Examiner.*

FRED McKELVEY, *Assistant Examiner.*